United States Patent
Chandler et al.

(10) Patent No.: US 10,498,762 B1
(45) Date of Patent: Dec. 3, 2019

(54) METHODS FOR HYPERTEXT MARKUP LANGUAGE (HTML) INPUT FIELD OBFUSCATION AND DEVICES THEREOF

(71) Applicant: Versafe Ltd., Tel Aviv (IL)

(72) Inventors: Uri Chandler, Tel Aviv (IL); Avihai Sitbon, Tel Aviv (IL)

(73) Assignee: VERSAFE LTD., Tel Aviv (IL)

( * ) Notice: Subject to any disclaimer, the term of this patent is extended or adjusted under 35 U.S.C. 154(b) by 46 days.

(21) Appl. No.: 15/282,090

(22) Filed: Sep. 30, 2016

Related U.S. Application Data

(60) Provisional application No. 62/245,072, filed on Oct. 22, 2015.

(51) Int. Cl.
*H04L 29/06* (2006.01)
*H04L 29/08* (2006.01)

(52) U.S. Cl.
CPC .......... *H04L 63/1491* (2013.01); *H04L 63/20* (2013.01); *H04L 67/02* (2013.01)

(58) Field of Classification Search
None
See application file for complete search history.

(56) References Cited

U.S. PATENT DOCUMENTS

| | | |
|---|---|---|
| 9,112,900 B1 | 8/2015 | Peacock et al. |
| 2005/0154873 A1 * | 7/2005 | Cam-Winget ...... H04L 63/0435 713/150 |
| 2008/0289035 A1 | 11/2008 | Delia et al. |
| 2009/0254994 A1 | 10/2009 | Waterson |
| 2011/0219446 A1 * | 9/2011 | Ichnowski .......... H04L 63/1441 726/22 |
| 2012/0304249 A1 * | 11/2012 | Luo ....................... G06F 21/554 726/1 |
| 2014/0258461 A1 * | 9/2014 | L'Heureux ............. H04L 67/02 709/219 |

OTHER PUBLICATIONS

F5 Networks, Inc., "BIG-IP Application Security Manager: Getting Started", Manual, Jan. 27, 2014, pp. 1-76, Version 11.5.
F5 Networks, Inc., "BIG-IP ASM 11.5.4", Release Notes, Apr. 12, 2016, Version 11.5.4.

(Continued)

*Primary Examiner* — Beemnet W Dada
*Assistant Examiner* — Hassan Saadoun
(74) *Attorney, Agent, or Firm* — Pepper Hamilton LLP

(57) ABSTRACT

A method, non-transitory computer readable medium, and security management apparatus that retrieves source code for a web page requested by a client device. A script is injected into the source code and the source code is sent to the client device. The script is configured to encrypt an attribute of an input field, remove event listeners from the input field, and insert decoy input fields into the source code. An HTTP message is received from the client device following submission of data via the input field. The message comprises the data, the encrypted attribute of the input field, and an attribute of each of the decoy input fields. The HTTP message is modified by decrypting the encrypted attribute, replacing the encrypted attribute with the decrypted attribute, and removing the decoy input field attributes. The modified HTTP message is sent to the web server device.

24 Claims, 5 Drawing Sheets

(56) References Cited

OTHER PUBLICATIONS

F5 Networks, Inc., "BIG-IP TMOS: Concepts", Manual, May 1, 2014, pp. 1-148, Version 11.5.
F5 Networks, Inc., "BIG-IP TMOS: Implementations", Manual, Mar. 19, 2015, pp. 1-288, Version 11.5.1.
F5 Networks, Inc., "BIG-IP® Application Security Manager Operations Guide", Jul. 2016, pp. 1-181, F5 Networks, Inc.
F5 Networks, Inc., "BIG-IP® Application Security Manager: Getting Started™", Aug. 25, 2014, pp. 1-78, version 11.6, F5 Networks, Inc.
F5 Networks, Inc., "BIG-IP® Application Security Manager: Implementations™", Aug. 25, 2014, pp. 1-420, version 11.6, F5 Networks, Inc.
F5 Networks, Inc., "BIG-IP® Local Traffic Management: Basics", Mar. 17, 2016, version 11.6, F5 Networks, Inc.
F5 Networks, Inc., "F5 BIG-IP TMOS: Operations Guide", Manual, Nov. 2015, pp. 1-279.
F5 Networks, Inc., "Traffic Management Shell (tmsh) Reference Guide", Manual, Mar. 4, 2014, pp. 1-2394, Version 11.5.1.
F5 Networks, Inc., "BIG-IP® Application Security Manager Operations Guide", Feb. 5, 2016, pp. 1-181, F5 Networks, Inc.
F5 Networks, Inc., "BIG-IP® Local Traffic Management: Basics", Aug. 25, 2014, pp. 1-74, version 11.6, F5 Networks, Inc.

\* cited by examiner

METHODS FOR HYPERTEXT MARKUP LANGUAGE (HTML) INPUT FIELD OBFUSCATION AND DEVICES THEREOF

This application claims the benefit of U.S. Provisional Patent Application Ser. No. 62/245,072, filed on Oct. 22, 2015, which is hereby incorporated by reference in its entirety.

FIELD

This technology generally relates to network security, and more particularly to methods and devices for HyperText Markup Language (HTML) input field obfuscation.

BACKGROUND

Many web applications are currently susceptible to malicious attacks, often by scripts installed and executed on client devices without user knowledge. The scripts can be trojans or other types of malicious code surreptitiously installed on client devices along with the opening of an e-mail attachment or installation of a web browser toolbar, for example, although many other types of scripts and methods for installation are used by malicious entities.

In some cases, malicious scripts target sensitive data input by users into web page forms. Accordingly, the malicious code can execute event listeners that attach to HTML input fields identified in the web page source code. The event listeners observe keystrokes to obtain sensitive data entered by a user into the web page input fields. In another example, malicious code can parse HTTP messages sent following a form submission to obtain data submitted via input fields having names or other attributes that may correspond with sensitive data (e.g., user name or password).

In yet another example, malicious scripts can parse web pages or web page source code to determine the order of input fields, particularly those input fields that may correspond with sensitive data. For example, if a web page includes a form with ten input fields, the eighth of which is determined to be associated with a social security number, malicious scripts can obtain the eighth name/value pair from the HTTP message sent following the form submission irrespective of whether the name or other attributes(s) of the corresponding input field is indicative of sensitive data ("social_security_number" or equivalent in this example).

SUMMARY

A method for HyperText Markup Language (HTML) input field obfuscation includes retrieving, by a security management apparatus, source code for a web page requested by a client device from a web server device. The source code includes an input field. A script is injected, by the security management apparatus, into the source code and the source code is sent to the client device. The script is configured to, when executed by a web browser of the client device, encrypt an attribute of the input field, remove one or more event listeners from the input field, and insert one or more decoy input fields into the source code. A HyperText Transport Protocol (HTTP) message is received, by the security management apparatus, from the client device following submission of data via the input field. The message includes the data, the encrypted attribute of the input field, and an attribute of each of the decoy input fields. The encrypted attribute of the input field is decrypted, by the security management apparatus, the encrypted attribute of the input field is replaced with the decrypted attribute of the input field, and the decoy input field attributes are removed to generate a modified HTTP message. The modified HTTP message is then sent, by the security management apparatus, to the web server device.

A security management apparatus includes memory including programmed instructions stored in the memory and one or more processors configured to be capable of executing the programmed instructions stored in the memory to retrieve source code for a web page requested by a client device from a web server device. The source code includes an input field. A script is injected into the source code and the source code is sent to the client device. The script is configured to, when executed by a web browser of the client device, encrypt an attribute of the input field, remove one or more event listeners from the input field, and insert one or more decoy input fields into the source code. An HTTP message is received from the client device following submission of data via the input field. The message includes the data, the encrypted attribute of the input field, and an attribute of each of the decoy input fields. The encrypted attribute of the input field is decrypted, the encrypted attribute of the input field is replaced with the decrypted attribute of the input field, and the decoy input field attributes are removed to generate a modified HTTP message. The modified HTTP message is then sent to the web server device.

A non-transitory computer readable medium having stored thereon instructions for HTML input field obfuscation includes executable code which when executed by one or more processors, causes the one or more processors to perform steps comprising retrieving source code for a web page requested by a client device from a web server device. The source code includes an input field. A script is injected into the source code and the source code is sent to the client device. The script is configured to, when executed by a web browser of the client device, encrypt an attribute of the input field, remove one or more event listeners from the input field, and insert one or more decoy input fields into the source code. An HTTP message is received from the client device following submission of data via the input field. The message includes the data, the encrypted attribute of the input field, and an attribute of each of the decoy input fields. The encrypted attribute of the input field is decrypted, the encrypted attribute of the input field is replaced with the decrypted attribute of the input field, and the decoy input field attributes are removed to generate a modified HTTP message. The modified HTTP message is then sent to the web server device.

This technology has a number of associated advantages including methods, non-transitory computer readable media, and security management apparatuses that increase the security of web applications and web pages with HTML form input fields. With this technology, the ability of attackers to monitor and parse HTTP messages sent following submission of a web page from, and to use event listeners, in order to surreptitiously obtain sensitive data is significantly reduced. Accordingly, this technology facilitates significantly increased security for web applications and web page that require the submission of sensitive data by users via forms and input fields.

DETAILED DESCRIPTION

Figure 1:
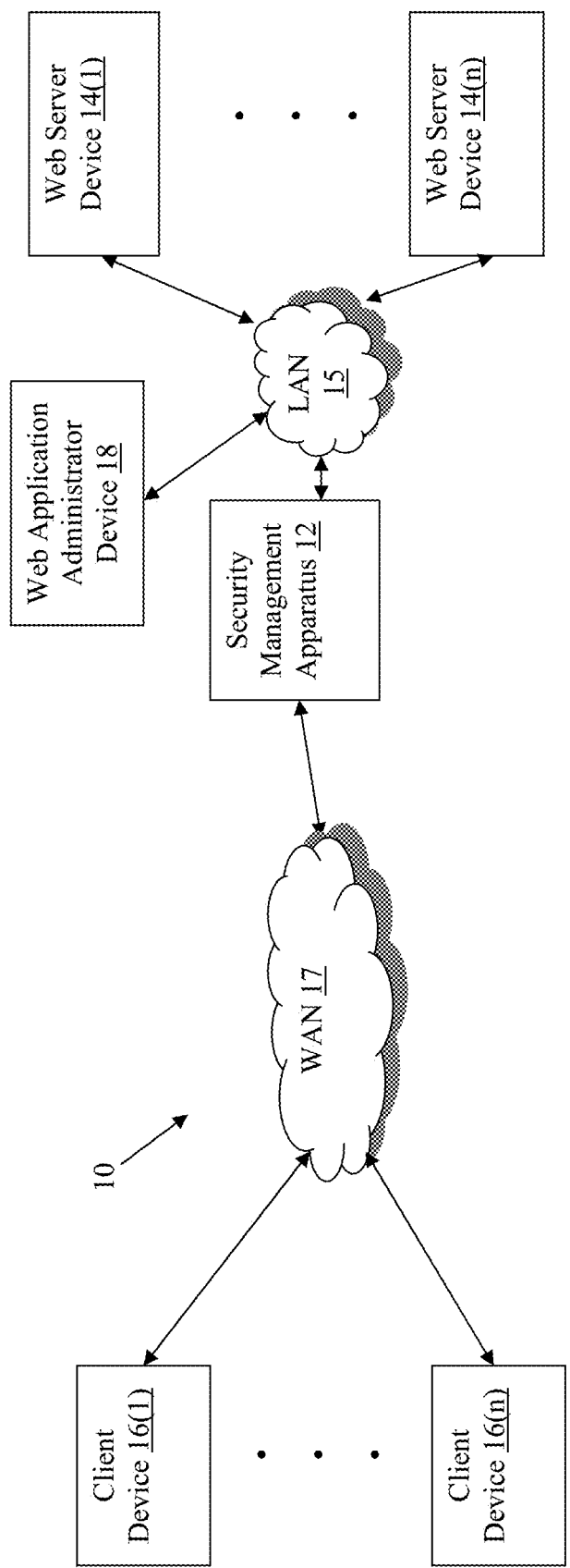
FIG. 1 is a system diagram of a network environment with an exemplary security management apparatus.

Referring to FIG. 1, a system diagram is shown including an exemplary network environment 10 which incorporates an exemplary security management apparatus 12. The security management apparatus 12 is coupled to a plurality of web server devices 14(1)-14(n) via a local area network (LAN) 15, a plurality of client devices 16(1)-16(n) via a wide area network 17, and a web application administrator device 18 via a direct connection or the LAN 15, for example, although the security management apparatus 12, web server devices 14(1)-14(n), client devices 16(1)-16(n), and web application administrator device 18 may be coupled together via other topologies. Additionally, the network environment 10 may include other network devices such as one or more routers and/or switches, for example, which are well known in the art and thus will not be described herein. This technology provides a number of advantages including methods, non-transitory computer readable media, and security management apparatuses that obfuscate HTML input fields associated with web page forms to thereby reduce the ability of malicious actors to obtain sensitive data.

Figure 2:
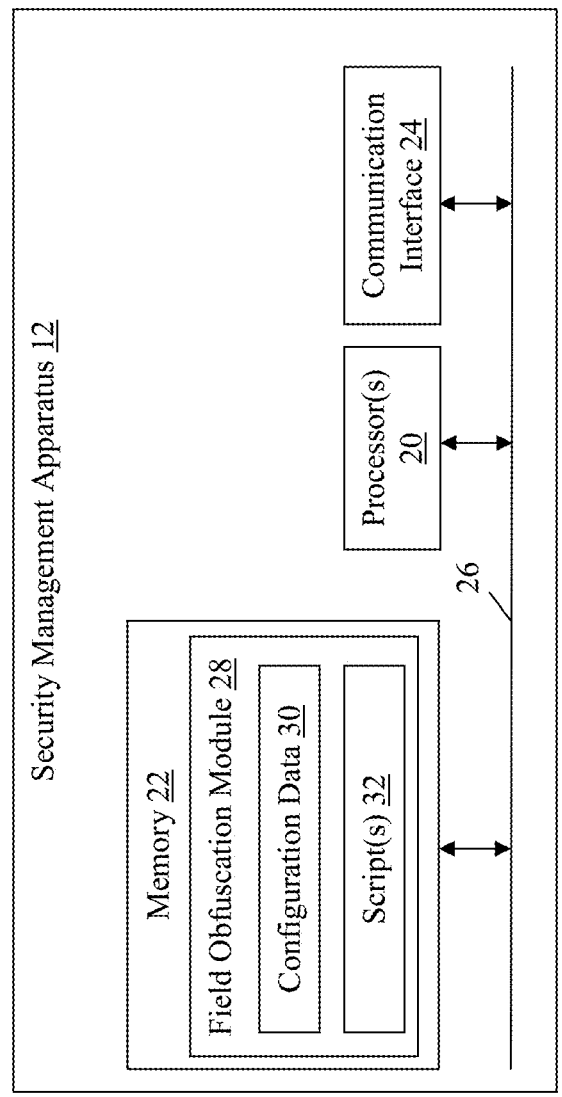
FIG. 2 is a block diagram of the exemplary security management apparatus shown in FIG. 1.

Referring to FIGS. 1-2, the security management apparatus 12 may perform any number of functions including managing network traffic, load balancing network traffic across the web server devices 14(1)-14(n), accelerating network traffic associated with web applications hosted by the web server devices 14(1)-14(n), or providing security or firewall services, for example. The security management apparatus 12 includes one or more processors 20, a memory 22, and a communication interface 24, which are coupled together by a bus 26 or other communication link, although the security management apparatus 12 can include other types and numbers of elements in other configurations.

The processor(s) 20 of the security management apparatus 12 may execute programmed instructions stored in the memory 22 of the security management apparatus 12 for the any number of the functions identified above. The processor(s) 20 of the security management apparatus 12 may include one or more CPUs or general purpose processors with one or more processing cores, for example, although other types of processor(s) can also be used.

The memory 22 of the security management apparatus 12 stores these programmed instructions for one or more aspects of the present technology as described and illustrated herein, although some or all of the programmed instructions could be stored elsewhere. A variety of different types of memory storage devices, such as random access memory (RAM), read only memory (ROM), hard disk, solid state drives, flash memory, or other computer readable medium which is read from and written to by a magnetic, optical, or other reading and writing system that is coupled to the processor(s) 20, can be used for the memory 22.

Accordingly, the memory 22 of the security management apparatus 12 can store one or more applications that can include computer executable instructions that, when executed by the security management apparatus 12, cause the security management apparatus 12 to perform actions, such as to transmit, receive, or otherwise process messages, for example, and to perform other actions described and illustrated below with reference to FIGS. 3-5. The application(s) can be implemented as modules or components of other applications. Further, the application(s) can be implemented as operating system extensions, module, plugins, or the like.

Even further, the application(s) may be operative in a cloud-based computing environment. The application(s) can be executed within or as virtual machine(s) or virtual server(s) that may be managed in a cloud-based computing environment. Also, the application(s), and even the security management apparatus 12 itself, may be located in virtual server(s) running in a cloud-based computing environment rather than being tied to one or more specific physical network computing devices. Also, the application(s) may be running in one or more virtual machines (VMs) executing on the security management apparatus 12. Additionally, in one or more embodiments of this technology, virtual machine(s) running on the security management apparatus 12 may be managed or supervised by a hypervisor.

In this particular example, the memory 22 of the security management apparatus 12 includes a field obfuscation module 28 that includes configuration data 30 and script(s) 32. The field obfuscation module 28 analyzes web pages retrieved from the web server devices 14(1)-14(n) in response to requests received from the client devices 16(1)-16(n). Based on the analysis and the configuration data, the field obfuscation module 28 determines whether the web pages and associated input fields are to be protected, in which case the field obfuscation module 28 injects one of the script(s) 32 into the source code for the web pages. The field obfuscation module 28 also analyzes HTTP messages sent following a submission of data via input fields of the web pages in order to modify the HTTP messages so that they can be properly interpreted by the web server devices 14(1)-14(n).

Accordingly, the configuration data 30 includes an indication of web pages that include input fields that are predefined as being protected. Web pages and/or certain input field(s) of specified web pages can be predefined as being protected by an administrator using the web application administrator device 18, for example, as described and illustrated in more detail later. The script(s) 32, when executed by web browsers of the client devices 16(1)-16(n), perform input field obfuscation by implementing techniques to make it more difficult for an attacker to obtain sensitive data, also as described and illustrated in more detail later.

The communication interface 24 of the security management apparatus 12 operatively couples and communicates between the security management apparatus 12, the web server devices 14(1)-14(n), the client devices 16(1)-16(n), and the web application administrator device 18, which are all coupled together by the WAN 17 and LAN 15, although other types and numbers of communication networks or systems with other types and numbers of connections and configurations to other devices and elements can also be used.

By way of example only, the WAN 17 and/or LAN 15 can use TCP/IP over Ethernet and industry-standard protocols, although other types and numbers of protocols and/or communication networks can be used. The WAN 17 and/or LAN 15 in this example can employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The WAN 17 and/or LAN 15 can also include direct connection(s) (e.g., for when the device illustrated in FIG. 1, such as the security management apparatus 12, client devices 16(1)-16(n), web server devices 14(1)-14(n), or web application administrator device 18 operate as virtual instances on the same physical machine). In some examples, the WAN 17 can be the Internet, although other types of networks can also be included in the network environment 10.

While the security management apparatus 12 is illustrated in this example as including a single device, the security management apparatus 12 in other examples can include a plurality of devices or blades each having one or more processors (each processor with one or more processing cores) that implement one or more steps of this technology. In these examples, one or more of the devices can have a dedicated communication interface or memory. Alternatively, one or more of the devices can utilize the memory, communication interface, or other hardware or software components of one or more other devices included in the security management apparatus 12.

Additionally, one or more of the devices that together comprise the security management apparatus 12 in other examples can be standalone devices or integrated with one or more other devices or apparatuses, such as one of the web server devices 14(1)-14(n) or the web application administrator device 18, for example. Moreover, one or more of the devices of the security management apparatus 12 in these examples can be in a same or a different communication network including one or more public, private, or cloud networks, for example.

Each of the web server devices 14(1)-14(n) in this example includes one or more processors, a memory, and a communication interface, which are coupled together by a bus or other communication link, although other numbers and types of network devices could be used. The web server devices 14(1)-14(n) in this example process requests received from the client devices 16(1)-16(n) related to hosted applications via the WAN 16 and LAN 15 according to the HTTP-based application RFC protocol, for example. Various applications may be operating on the web server devices 14(1)-14(n) and transmitting data (e.g., files or Web pages) to the client devices 16(1)-16(n) via the security management apparatus 12 in response to requests from the client devices 16(1)-16(n). The web server devices 14(1)-14(n) may be hardware or software or may represent a system with multiple servers in a pool, which may include internal or external networks.

Although the web server devices 14(1)-14(n) are illustrated as single devices, one or more actions of each of the web server devices 14(1)-14(n) may be distributed across one or more distinct network computing devices that together comprise one or more of the web server devices 14(1)-14(n). Moreover, the web server devices 14(1)-14(n) are not limited to a particular configuration. Thus, the web server devices 14(1)-14(n) may contain a plurality of network computing devices that operate using a master/slave approach, whereby one of the network computing devices of the web server devices 14(1)-14(n) operate to manage and/or otherwise coordinate operations of the other network computing devices. The web server devices 14(1)-14(n) may operate as a plurality of network computing devices within a cluster architecture, a peer-to peer architecture, virtual machines, or within a cloud architecture, for example.

Thus, the technology disclosed herein is not to be construed as being limited to a single environment and other configurations and architectures are also envisaged. For example, one or more of the web server devices 14(1)-14(n) can operate within the security management apparatus 12 itself rather than as a standalone device communicating with the security management apparatus 12 via the LAN 15. In this example, the one or more web server devices 14(1)-14(n) operate within the memory 22 of the security management apparatus 12.

The client devices 16(1)-16(n) in this example include any type of computing device that can request access to web pages hosted by the web server devices 14(1)-14(n), such as mobile computing devices, desktop computing devices, laptop computing devices, tablet computing devices, virtual machines (including cloud-based computers), or the like. Each of the client devices 16(1)-16(n) in this example includes a processor, a memory, and a communication interface, which are coupled together by a bus or other communication link, although other numbers and types of network devices could be used.

The client devices 16(1)-16(n) may run interface applications, such as standard web browsers or standalone client applications, which may provide an interface to make requests for, and receive content stored on, one or more of the web server devices via the WAN 17 and LAN 15. The client devices 16(1)-16(n) may further include a display device, such as a display screen or touchscreen, and/or an input device, such as a keyboard for example.

The web application administrator device 18 in this example includes a processor, a memory, and a communication interface, which are coupled together by a bus or other communication link, although other numbers and types of network devices could be used. The web application administrator device may also include an input device and a display device and may run interface applications, such as a web browser, that may provide an interface to register web page(s) and associated input field(s) as protected with the security management apparatus, as described and illustrated in more detail later.

Although the exemplary network environment 10 with the security management apparatus 12, web server devices 14(1)-14(n), client devices 16(1)-16(n), web application administrator device 18, WAN 17, and LAN 15 are described and illustrated herein, other types and numbers of systems, devices, components, and elements in other topologies can be used. It is to be understood that the systems of the examples described herein are for exemplary purposes, as many variations of the specific hardware and software used to implement the examples are possible, as will be appreciated by those skilled in the relevant art(s).

One or more of the components depicted in the network environment 10, such as the security management apparatus 12, client devices 16(1)-16(n), web server devices 14(1)-14(n), or web application administrator device 18, for example, may be configured to operate as virtual instances on the same physical machine. In other words, one or more of the security management apparatus 12, client devices 16(1)-16(n), web server devices 14(1)-14(n), or web application administrator device 18 may operate on the same physical device rather than as separate devices communicating through communication network(s). Additionally, there may be more or fewer security management apparatuses 12, client devices 16(1)-16(n), web server devices 14(1)-14(n), or web application administrator device 18 than illustrated in FIG. 1.

In addition, two or more computing systems or devices can be substituted for any one of the systems or devices in any example. Accordingly, principles and advantages of distributed processing, such as redundancy and replication also can be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Exemplary methods for HTML input field obfuscation will now be described with reference to FIGS. 1-5. Referring more specifically to FIG. 3, a method for injecting scripts to obfuscate input fields and managing form submission responses by the security management apparatus 12 is illustrated. In step 300 in this particular example, the security management apparatus 12 obtains configuration data identifying web page(s) and, optionally, associated protected input field(s). In this example, the security management apparatus 12 optionally stores the configuration data 30 in the memory 22.

Also optionally, the security management apparatus 12 can present an interface to the web application administrator device 18 in order to obtain the configuration data 30, although the configuration data 30 can be obtained in other manners. Accordingly, a user of the web application administrator device 18 can submit via the interface an indication of a web page and, optionally, the associated input field(s) to be protected. The web page can be associated with a web application hosted by one of the web server devices 14(1)-14(n), for example.

In one example, the web page can be a login web page with four input fields, one of which is configured to facilitate submission of a password. Accordingly, the user of the web application administrator device 18 can identify the password field as protected in this example, although any other type of web page or type or number of input fields can also be protected. Additionally, the security management apparatus 12 can optionally be configured to protect all input fields of an identified web page by default or at the request of a user of the web application administrator device 18.

In step 302, the security management apparatus 12 receives a request from one of the client devices 16(1)-16(n) for one of the web pages hosted by one of the web server devices 14(1)-14(n) that was previously identified by a user of the web application administrator device 18 as having input field(s) that are to be protected. In response to the request, the security management apparatus 12 retrieves the web page from the one of the web server devices 14(1)-14(n).

In examples in which the configuration data 30 is optionally used, the security management apparatus 12 can optionally compare an identifier (e.g., URL) of the requested web page to the configuration data 30 to determine whether the web page includes input field(s) that are to be protected. In these examples, if the security management apparatus 12 determines that the web page does not include input field(s) that are to be protected, then the security management apparatus 12 can forward the web page to the requesting one of the client devices 16(1)-16(n) without performing steps 304-308. In other examples, the security management apparatus 12 can be configured to perform steps 304-308 by default for all requested web pages that include input fields irrespective of any configuration data 30, and other configurations can also be used.

In this particular example, the security management apparatus 12 determines that the requested web page does include input field(s) that are to be protected based on a default configuration of the security management apparatus 12 or a match of an identifier of the web page with the configuration data 30. Accordingly, in step 304, the security management apparatus 12 injects one of the script(s) 32 stored in the memory 22 into the source code of the web page.

Optionally, the one of the script(s) 32 can be injected into the body of the source code after the body HTML tag, although other locations can also be used. In this particular example, the injected script is configured to, when executed by a web browser of the one of the client devices 16(1)-16(n), encrypt the name of, and remove event listener(s) from, protected input field(s), and insert decoy input field(s) into the source code of the web page. The operation of the script is described and illustrated in more detail later with reference to FIG. 4.

While the name attribute of the protected input fields is used in the examples described and illustrated herein, any other attribute or parameter (e.g., the ID attribute) of the protected input field(s) can also be used. In one example, the script is a JavaScript script, although other types of scripts can also be used. Subsequent to injecting the script, the security management apparatus 12 sends the source code for the web page to the one of the client devices 14(1)-14(n). In examples in which all of the input fields are not protected for the web page, the security management apparatus 12 can optionally retrieve an indication of the protected input fields from the configuration data 30 associated with the web page, and provide the indications to the one of the client devices 14(1)-14(n) along with the web page (e.g., as part of the script 32).

In step 306, the security management apparatus 12, receives an HTTP message following submission of data via the form of the web page that includes the input field(s). In one example, the HTTP message can include a name/value pair for each of the input field(s). The name/value pairs include an input field name and corresponding value submitted by a user of the one of the client devices 16(1)-16(n) via the input field associated with the input field name. In this particular example, the security management apparatus 12 modifies the HTTP message by replacing the name(s) of the protected input field(s) with corresponding decrypted name(s) and removing name(s) of any decoy input fields inserted by the injected script 32.

As described and illustrated in more detail later, the security management apparatus 12 can optionally use a key that is used by the script to encrypt the name(s) of the protected input field(s) in order to decrypt the encrypted input field name(s) in the HTTP message. Additionally, in one example, the security management apparatus 12 can receive a cookie identifying the encrypted input field name(s) and/or the names of any decoy input field(s). Accordingly, the security management apparatus 12 can remove any name/value pairs from the HTTP message that include a name matching one of the names identified in the cookie as corresponding to a decoy input field name. Other methods for facilitating encryption of the input field name(s) and/or communicating the decoy input field names can also be used.

In step 308, the security management apparatus 12 sends the modified HTTP message to a source of the web page, which is the one of the web server devices 14(1)-14(n) in this particular example. Accordingly, because the HTTP message received by the security management apparatus 12 includes encrypted input field names in the name/value pairs, a malicious actor will advantageously not be able to observe the HTTP message and determine which value of a name/value pair corresponds to sensitive data (e.g., a password).

Additionally, because the HTTP message received by the security management apparatus 12 includes name/value pairs resulting from the inserted decoy input fields(s), a malicious actor will advantageously not be able to observe the HTTP message and determine which value of a name/value pair corresponds to sensitive data based on any predetermined order of input fields and corresponding order of the name/value pairs in the HTTP message.

Figure 3:
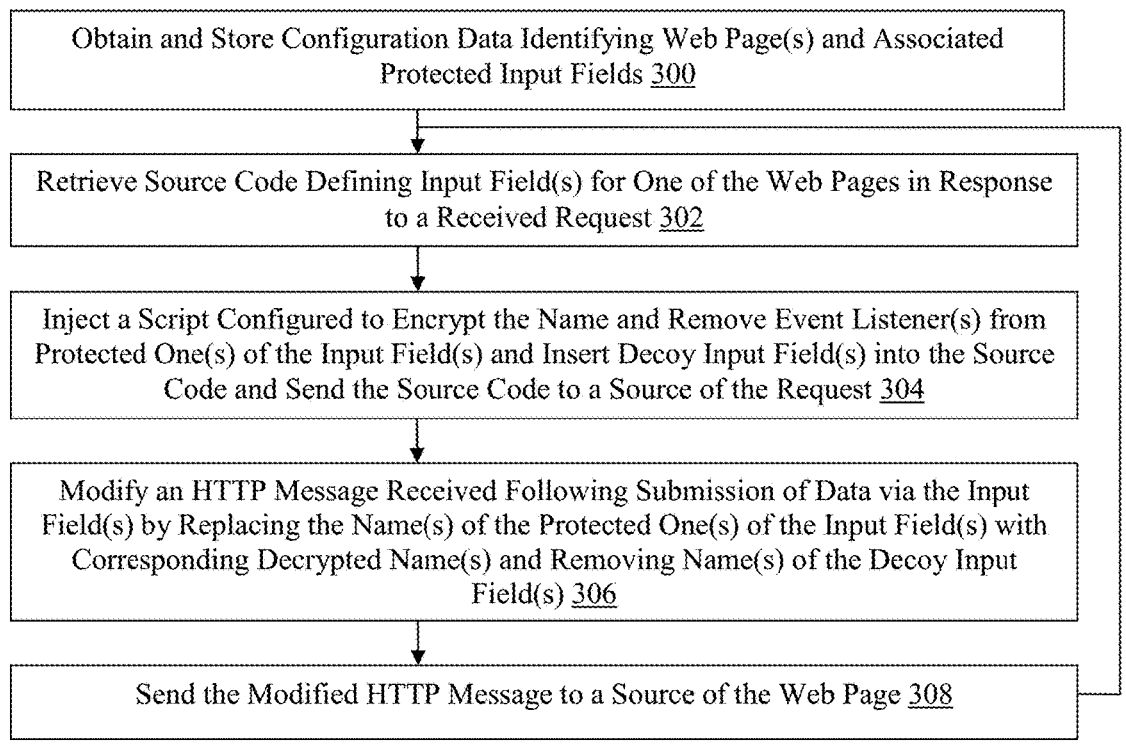
FIG. 3 is a flowchart of an exemplary method for injecting scripts to obfuscate input fields and managing form submission responses.
Figure 4:
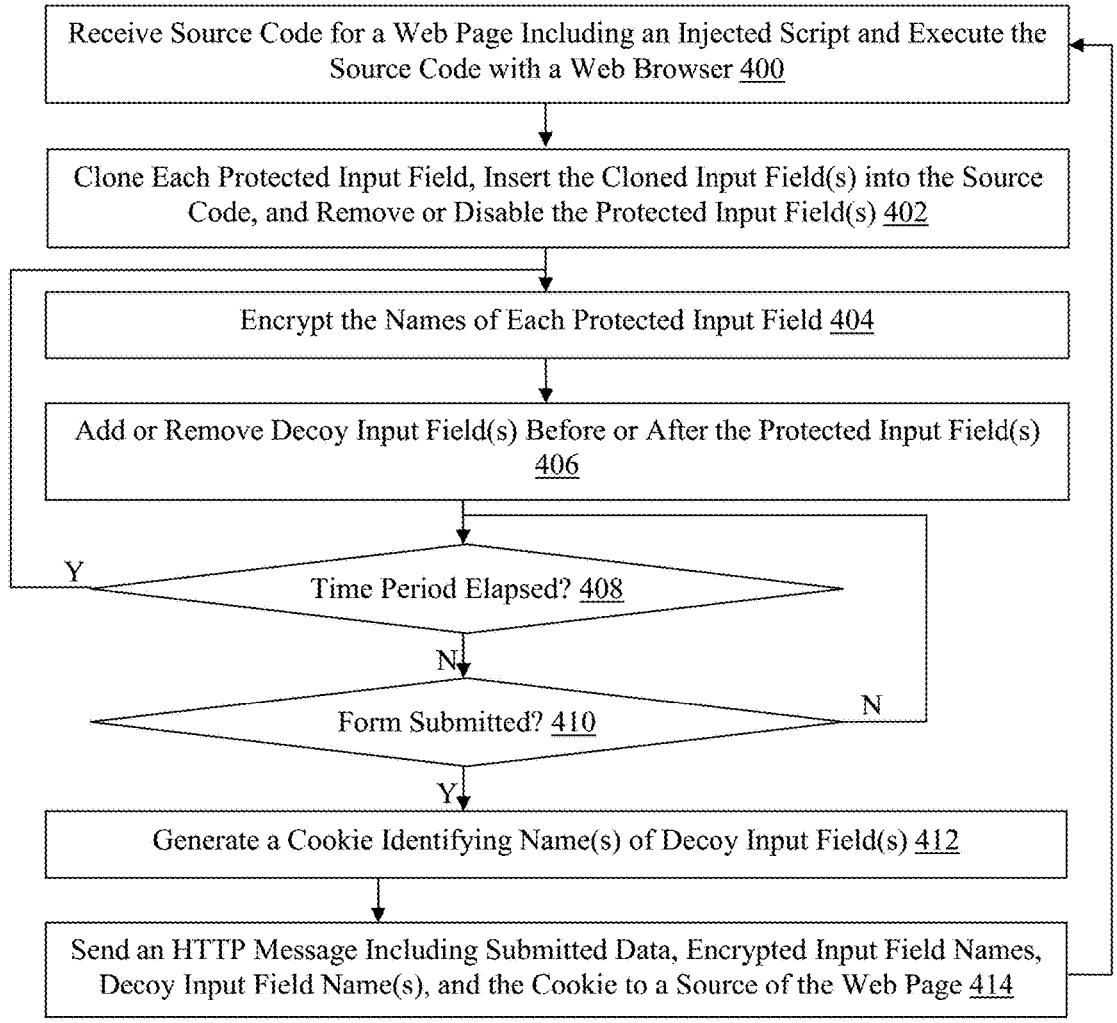
FIG. 4 is a flowchart of an exemplary method for obfuscating HyperText Markup Language (HTML) input fields by a client device using injected scripts.

Referring more specifically to FIG. 4, a method for obfuscating HTML input fields by one of the client devices 16(1)-16(n) using injected script(s) 32 is illustrated. In step 400 in this example, one of the client devices 16(1)-16(n) receives source code for a web page including an injected script 32 and executes the source code with a web browser. The one of the client devices 16(1)-16(n) can be the one of the client devices 16(1)-16(n) that requested the web page as described and illustrated earlier with reference to step 302 of FIG. 3, and the script 32 could have been injected as described and illustrated earlier with reference to step 304 of FIG. 3, for example.

Referring back to FIG. 4, in step 402, the web browser of the one of the client devices 16(1)-16(n) executing the injected script 32 clones each of the protected input field(s), inserts the cloned input field(s) into the source code, and removes or disables the protected input field(s) from the source code. In order to clone the protected input field(s), the script copies all of the parameters or attributes of the protected input field(s). Cloning the protected input field(s) ensures that any event listeners will be removed from the protected input field(s) since event listeners will only attach to the original input field(s). However, a malicious actor could still obtain sensitive data based on the name of the cloned protected input field(s), as described in more detail earlier.

Accordingly, in step 404, the web browser of the one of the client devices 16(1)-16(n) executing the injected script 32 encrypts the name of each of the protected input field(s) using a key provided by the security management apparatus 12. By encrypting the input field name(s), the HTTP message sent following submission of the form associated with the input field(s) will include encrypted input field names in the name/value pairs, which will not therefore identify sensitive data or allow malicious actors to obtain sensitive data based on the name of the cloned protected input field(s). However, a malicious actor could still obtain the sensitive data based on knowledge of the order of the input field(s) in the web page form, and associated order of the name/value pairs in the HTTP message generated by submission of the web page form, as described in more detail earlier.

Accordingly, in step 406, the web browser of the one of the client devices 16(1)-16(n) executing the injected script 32 adds or removes a random number of decoy input field(s) before or after the protected input field(s) in the web page source code. The decoy input field(s) can be invisible input field(s) with randomly generated names, although other types of decoy input field(s) can also be used in other examples.

In a first iteration, the decoy input field(s) will be added to the source code for the web page, however one or more decoy input field(s) can be inserted and/or removed from the source code during subsequent iterations, as described and illustrated in more detail later. Additionally, in a first iteration, at least one decoy input field is added prior to a first protected input field so that a malicious attacker cannot rely on the order of the name/value pairs in the resulting HTTP message. In this example, the script 32 optionally maintains a list of the names of the decoy input field(s) currently inserted into to the source code, which is used as described and illustrated in more detail later with reference to step 412.

In step 408, the web browser of the one of the client devices 16(1)-16(n) executing the injected script 32 optionally determines whether a predefined time period has elapsed. If the web browser of the one of the client devices 16(1)-16(n) executing the injected script determines that the time period has elapsed, then the Yes branch is taken back to step 404, and steps 404-408 are repeated. Accordingly, in this example, the script periodically re-encrypts the names of the protected input field(s) and varies the number and/or placement of the decoy input field(s) in the source code in order to further increase security. Referring back to step 408, if the web browser of the one of the client devices 16(1)-16(n) executing the injected script 32 determines that the time period has not elapsed, then the No branch is taken to step 410.

In step 410, the web browser of the one of the client devices 16(1)-16(n) executing the injected script 32 determines whether the form including the protected input field(s) has been submitted by a user of the one of the client devices 16(1)-16(n). If the web browser of the one of the client devices 16(1)-16(n) executing the injected script 32 determines the form including the protected input field(s) has not been submitted by a user of the one of the client devices 16(1)-16(n), then the No branch is taken back to step 408, and the one of the client devices 16(1)-16(n) effectively waits for the time period to elapse or the form to be submitted. Accordingly, if the web browser of the one of the client devices 16(1)-16(n) executing the injected script 32 determines that the form including the protected input field(s) has been submitted by a user of the one of the client devices 16(1)-16(n), then the Yes branch is taken to step 412.

In step 412, the web browser of the one of the client devices 16(1)-16(n) generates a cookie identifying the name(s) of the decoy input field(s) currently inserted and, optionally, the encrypted name(s) of the protected input field(s). The cookie can be used by the security management apparatus 12 to modify the HTTP message generated by the form submission to remove the name/value pair(s) corresponding to the decoy input field(s), as described and illustrated in more detail earlier with reference to step 306 of FIG. 3.

Subsequently, in step 414, the web browser of the one of the client devices 16(1)-16(n) sends an HTTP message including the encrypted input field name(s) and associated value(s) submitted by the user, the decoy input field name(s) and associated randomly generated values, and the optional cookie, to a source of the web page, which in this example is the security management apparatus 12. Accordingly, a malicious actor observing the HTTP message will advantageously not be able to determine from the names or order of the name/value pairs of the HTTP message, which of the value(s) represent sensitive data. The HTTP message can then be received and processed by the security management apparatus 12 as described and illustrated in more detail earlier with reference to steps 306-308 of FIG. 3.

Figure 5:
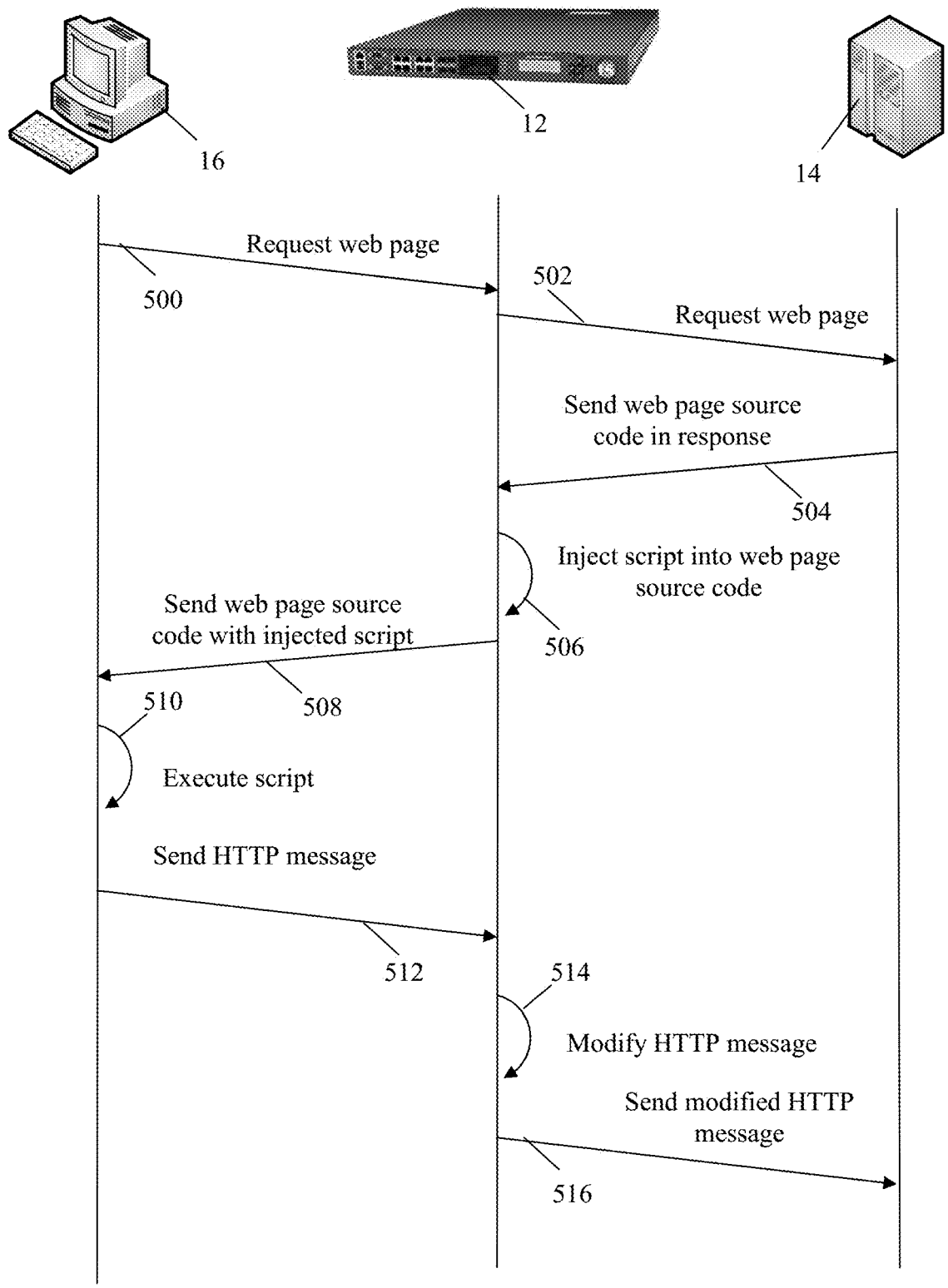
FIG. 5 is a timing diagram of an exemplary method for HTML input field obfuscation.

Referring more specifically to FIG. 5, a timing diagram of a method for obfuscating HTML input fields is illustrated. In step 500 in this example, the client device 16 sends a request for a web page, which is received by the security management apparatus 12. In step 502, the security management apparatus 12 requests the web page from the web server device 14. In step 504, the web server device 14 sends the web page source code to the security management apparatus 12 in response to the request received in step 502.

In step 506, the security management apparatus 12 determines that the web page has been previously identified as protected or as including input field(s) that are to be protected, such as based on a default configuration or configured data 30 previously obtained from a web application administrator. Accordingly, the security management apparatus 12 injects a script 32 into the web page source code and, in step 508, sends the web page source code with the injected script 32 to the client device 16.

In step 510, a web browser executed by the client device 16 executes the script 32, which removes event listener(s) from one or more protected input field(s) of the web page, encrypts and thereby obfuscates the names of the protected input field(s), and inserts/removes decoy input field(s) and thereby obfuscates the order of the protected input field(s), as described and illustrated in more detail earlier. Upon submission of the form including the protected input field(s), in step 512, the client device 16 sends an HTTP message with name/value pairs including at least name/value pairs corresponding to the protected input field(s) and the decoy input field(s). Optionally, the client device 16 also sends a cookie identifying the encrypted names of the name/value pairs corresponding to the protected input field(s) and/or the names of the name/value pairs corresponding to the inserted decoy input field(s).

In step 516, the security management apparatus 12 receives the HTTP message and modifies the HTTP message to both decrypt the names of the name/value pairs corresponding to the protected input field(s) and remove the name/value pairs corresponding to the inserted decoy input field(s), as described and illustrated in more detail earlier with reference to step 306 of FIG. 3, for example. In step 516, the security management apparatus 12 sends the modified HTTP message to the web server device 14 to be processed, such as by a web application hosted by the web server device 14, for example.

Accordingly, with this technology, the ability of malicious actors to obtain sensitive data input via HTML form input fields is significantly reduced. In particular, attackers will not be able to utilize event listeners to obtain sensitive data input by users into input fields or retrieve sensitive data from HTTP messages sent following submission of a web page from based on a match of a name with a name/value pair or reliance on an order of the name/value pairs in the HTTP message. Accordingly, this technology facilitates significantly increased security for web applications that require the submission of sensitive data by users.

Having thus described the basic concept of the disclosed technology, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the disclosed technology. Additionally, the recited order of processing elements or sequences, or the use of numbers, letters, or other designations therefore, is not intended to limit the claimed processes to any order except as may be specified in the claims. Accordingly, the disclosed technology is limited only by the following claims and equivalents thereto.

What is claimed is:

1. A method for input field obfuscation implemented by a network traffic management system comprising one or more security management apparatuses, server devices, or client devices, the method comprising:

injecting a script into source code of a web page received from a server and sending the source code to a requesting client, wherein the script is configured to insert at least one decoy input field into the source code preceding a location of a protected input field to modify an order of an encrypted attribute of the protected input field in an application layer message resulting from submission of data via the protected input field;

receiving the application layer message from the client, wherein the application layer message comprises the data, the encrypted attribute of the protected input field, and an attribute of the decoy input field;

replacing the encrypted attribute of the protected input field with a decrypted attribute of the protected input field and removing the decoy input field attribute to generate a modified application layer message; and sending the modified application layer message to the server.

2. The method of claim 1, wherein the decoy input field is defined to be invisible upon rendering of the web page in a web browser.

3. The method of claim 1, wherein the script is further configured to clone the protected input field including each of one or more parameters of the protected input field, insert the cloned protected input field into the source code, and remove or disable the protected input field, in order to remove one or more event listeners from the protected input field, wherein the event listeners are attached to, and configured to observe keystrokes associated with, the protected input field.

4. The method of claim 1, wherein the script is further configured to generate a cookie comprising the decoy input field attribute and the method further comprises:

receiving the cookie; and removing the decoy input field attribute from the application layer message based on a match of the decoy input field attribute in the cookie.

5. The method of claim 1, wherein the script is configured to periodically re-encrypt the attribute of the protected input field or insert one or more other decoy input fields into the source code prior to the submission of the data.

6. A non-transitory computer readable medium having stored thereon instructions for input field obfuscation comprising executable code which when executed by one or more processors, causes the processors to:

inject a script into source code of a web page received from a server and sending the source code to a requesting client, wherein the script is configured to insert at least one decoy input field into the source code preceding a location of a protected input field to modify an order of an encrypted attribute of the protected input field in an application layer message resulting from submission of data via the protected input field;

receive the application layer message from the client, wherein the application layer message comprises the data, the encrypted attribute of the protected input field, and an attribute of the decoy input field;

replace the encrypted attribute of the protected input field with a decrypted attribute of the protected input field and remove the decoy input field attribute to generate a modified application layer message; and send the modified application layer message to the server.

7. The non-transitory computer readable medium of claim 6, wherein the decoy input field is defined to be invisible upon rendering of the web page in a web browser.

8. The non-transitory computer readable medium of claim 6, wherein the script is further configured to clone the protected input field including each of one or more parameters of the protected input field, insert the cloned protected input field into the source code, and remove or disable the protected input field, in order to remove one or more event listeners from the protected input field, wherein the event listeners are attached to, and configured to observe keystrokes associated with, the protected input field.

9. The non-transitory computer readable medium of claim 6, wherein the script is further configured to generate a cookie comprising the decoy input field attribute and the executable code when executed by the processor further causes the processor to:

receive the cookie; and remove the decoy input field attribute from the application layer message based on a match of the decoy input field attribute in the cookie.

10. The non-transitory computer readable medium of claim 6, wherein the script is configured to periodically re-encrypt the attribute of the protected input field or insert one or more other decoy input fields into the source code prior to the submission of the data.

11. A security management apparatus, comprising memory comprising programmed instructions stored thereon and one or more processors configured to be capable of executing the stored programmed instructions to:

inject a script into source code of a web page received from a server and sending the source code to a requesting client, wherein the script is configured to insert at least one decoy input field into the source code preceding a location of a protected input field to modify an order of an encrypted attribute of the protected input field in an application layer message resulting from submission of data via the protected input field;

receive the application layer message from the client, wherein the application layer message comprises the data, the encrypted attribute of the protected input field, and an attribute of the decoy input field;

replace the encrypted attribute of the protected input field with a decrypted attribute of the protected input field and remove the decoy input field attribute to generate a modified application layer message; and send the modified application layer message to the server.

12. The security management apparatus of claim 11, wherein the decoy input field is defined to be invisible upon rendering of the web page in a web browser.

13. The security management apparatus of claim 11, wherein the script is further configured to clone the protected input field including each of one or more parameters of the protected input field, insert the cloned protected input field into the source code, and remove or disable the protected input field, in order to remove one or more event listeners from the protected input field, wherein the event listeners are attached to, and configured to observe keystrokes associated with, the protected input field.

14. The security management apparatus of claim 11, wherein the script is further configured to generate a cookie comprising the decoy input field attribute and the one or more processors are further configured to be capable of executing at the stored programmed instructions to:

receive the cookie; and remove the decoy input field attribute from the application layer message based on a match of the decoy input field attribute in the cookie.

15. The security management apparatus of claim 11, wherein the script is configured to periodically re-encrypt the attribute of the protected input field or insert one or more other decoy input fields into the source code prior to the submission of the data.

16. A network traffic management system comprising one or more security management apparatuses, client devices, or server devices, the network traffic management system comprising memory comprising programmed instructions stored thereon and one or more processors configured to be capable of executing the stored programmed instructions to:

inject a script into source code of a web page received from a server and sending the source code to a requesting client, wherein the script is configured to insert at least one decoy input field into the source code preceding a location of a protected input field to modify an order of an encrypted attribute of the protected input field in an application layer message resulting from submission of data via the protected input field;

receive the application layer message from the client, wherein the application layer message comprises the data, the encrypted attribute of the protected input field, and an attribute of the decoy input field;

replace the encrypted attribute of the protected input field with a decrypted attribute of the protected input field and remove the decoy input field attribute to generate a modified application layer message; and send the modified application layer message to the server.

17. The network traffic management system of claim 16, wherein the decoy input field is defined to be invisible upon rendering of the web page in a web browser.

18. The network traffic management system of claim 16, wherein the script is further configured to clone the protected input field including each of one or more parameters of the protected input field, insert the cloned protected input field into the source code, and remove or disable the protected input field, in order to remove one or more event listeners from the protected input field, wherein the event listeners are attached to, and configured to observe keystrokes associated with, the protected input field.

19. The network traffic management system of claim 16, wherein the script is further configured to generate a cookie comprising the decoy input field attribute and the one or more processors are further configured to be capable of executing the stored programmed instructions to:

receive the cookie; and remove the decoy input field attribute from the application layer message based on a match of the decoy input field attribute in the cookie.

20. The network traffic management system of claim 16, wherein the script is configured to periodically re-encrypt the attribute of the protected input field or insert one or more other decoy input fields into the source code prior to the submission of the data.

21. The method of claim 1, wherein the application layer message comprises a HyperText Transport Protocol (HTTP) message.

22. The non-transitory computer readable medium of claim 6, wherein the application layer message comprises a HyperText Transport Protocol (HTTP) message.

23. The security management apparatus of claim 11, wherein the application layer message comprises a HyperText Transport Protocol (HTTP) message.

24. The network traffic management system of claim 16, wherein the application layer message comprises a HyperText Transport Protocol (HTTP) message.

\* \* \* \* \*